March 9, 1954 V. L. BARNES 2,671,273
ADJUSTABLE TEMPLATE
Filed Dec. 9, 1950 2 Sheets-Sheet 1
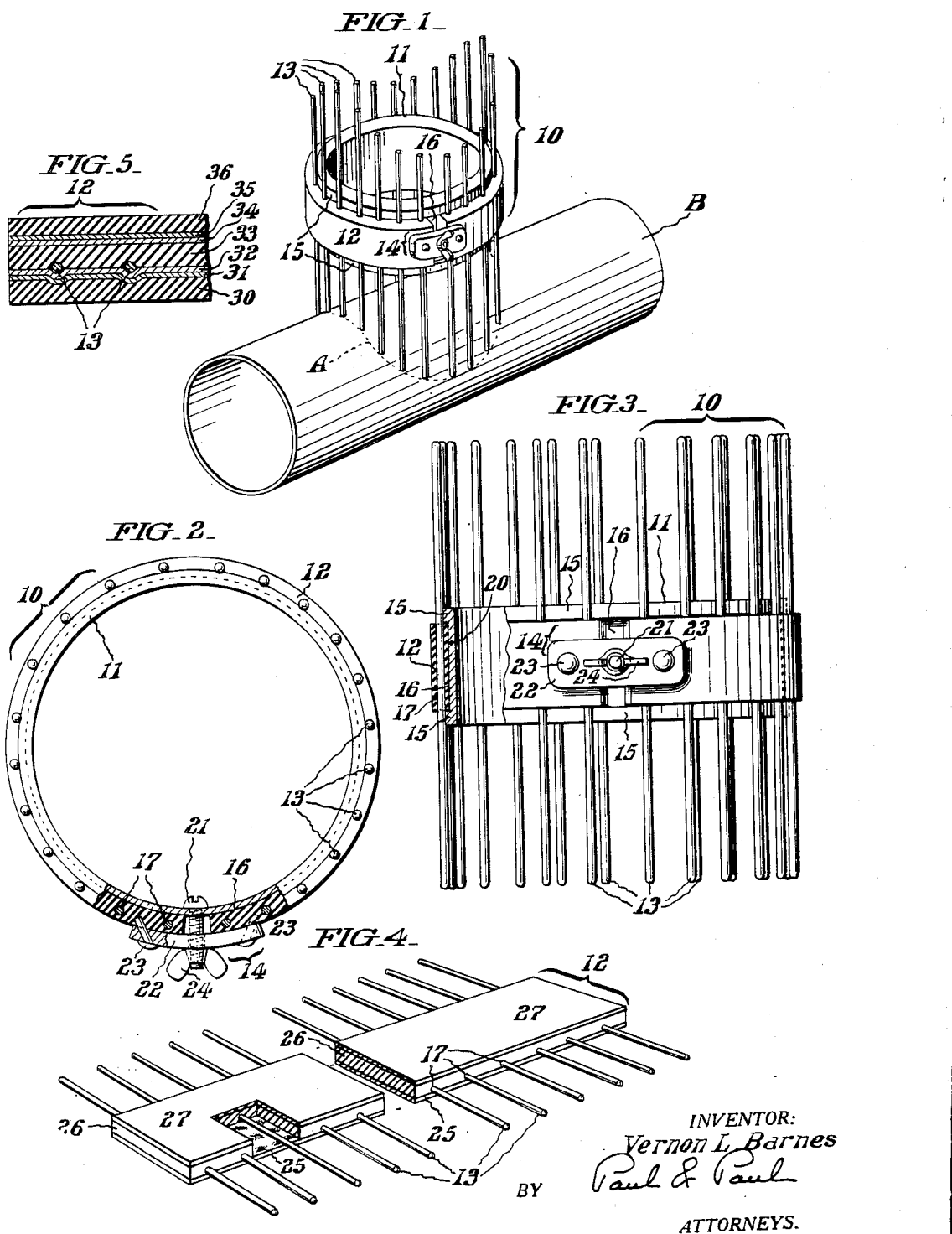
INVENTOR:
Vernon L. Barnes
BY Paul & Paul
ATTORNEYS.

March 9, 1954  V. L. BARNES  2,671,273
ADJUSTABLE TEMPLATE
Filed Dec. 9, 1950  2 Sheets-Sheet 2

INVENTOR:
Vernon L. Barnes
BY Paul & Paul
ATTORNEYS.

Patented Mar. 9, 1954

2,671,273

UNITED STATES PATENT OFFICE 2,671,273

ADJUSTABLE TEMPLATE

Vernon L. Barnes, National Park, N. J.

Application December 9, 1950, Serial No. 200,071

7 Claims. (Cl. 33—175)

This invention relates to an adjustable measuring device or template for measuring and recording the shape of the line of intersection of two bodies. More particularly the invention concerns an adjustable tubular marking device for determining the contour of the intersections of pipes and tubes.

In the formation of pipe joints it is frequently necessary to join together a pair of pipes disposed at angles to one another, such pipes having equal or unequal diameters. To form the joint an appropriate piece of material of suitable shape must be removed from the surface of one such pipe to form an opening for the other pipe, and the end of the other pipe must also be accordingly shaped so that the pipes will have openings of similar contour. While it is possible to determine geometrically the precise nature of the shape of the pipe material to be removed for any given combination of angular relationships and pipe sizes, this procedure is difficult and tedious.

Adjustable intersection markers have previously been devised in an effort to provide a practical device for making the necessary determinations and markings with minimum effort. However such devices have invariably involved the use of relatively cumbersome apparatus which is expensive to manufacture and difficult to maintain in operating condition. As an example, prior patentees have proposed the use of a flexible band consisting of a series of pivotally joined links of rigid inflexible material such as metal or the like, including a set of spaced rods which are disposed within the pivot connections for the links. Such apparatus is subject to the objections that the metal links are readily broken or deformed in use, and that they include no satisfactory means for maintaining the rods in position after adjustment.

It is accordingly an object of the invention to provide an adjustable template for use in determining the contour of an intersection of solid bodies. It is a further object of the invention to provide an efficient, simple and economical adjustable template. Still another object is to provide an adjustable measuring and marking indicator wherein the marking means are readily adjustable under application of moderate force and are frictionally maintained in position after adjustment. Other objects and advantages of the invention, including the ready adaptability of the same to a wide variety of uses, will appear in further detail hereinafter.

In summary, the foregoing and other objects are attained by the provision of a substantially continuous band of flexible inelastic material having spaced apertures extending transversely of said band, and a set of pins frictionally maintained in said apertures.

Of the drawings:

Fig. 1 represents a view in perspective of one embodiment of adjustable template in accordance with the invention, illustrated in position for measuring and marking the contour of the intersection of a pair of pipes;

Fig. 2 represents an end elevation of the adjustable template, with parts broken away and others shown in section, in order more clearly to disclose important details;

Fig. 3 represents a side elevation of the adjustable template, parts also being broken away and shown in section;

Fig. 4 represents a view in perspective of a modified form of flexible band which constitutes one element of the adjustable template;

Fig. 5 represents a fragmentary side sectional view of another embodiment of flexible band;

Figure 6:
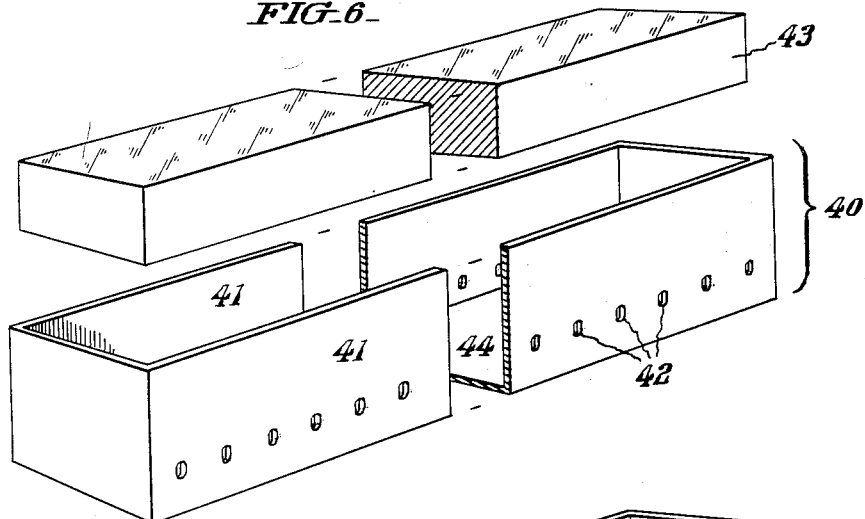
Fig. 6 represents a view in perspective of a mold particularly adapted for the formation of a flexible band in accordance with the invention.

It will be appreciated that the embodiments of the invention selected for illustration in the drawings constitute selected embodiments thereof, and that the invention is also capable of assuming a wide variety of other forms not shown.

Having reference to Fig. 1 of the drawings, wherein a single embodiment of the invention appears, the adjustable template 10 is shown in position for determining the proper outline A for forming a joint on the pipe B. The adjustable template includes a ring 11, a flexible inelastic band 12, and a set of parallel pins 13 which project through the band. The pins 13 are frictionally maintained but are readily adjustable with respect to the band 12 to conform to the contour of the pipe B, or other work object. The band 12 is removably secured in position on the ring 11 by means of the clamp 14.

Referring now to Figs. 1-3 of the drawings, the ring 11 has a pair of peripheral flanges 15 defining a central annular channel 16. The peripheral faces of the opposed flanges 15 are parallel to one another, and spaced equally from the annular face of channel 16. The band 12, which is seated in channel 16, has a set of equally spaced apertures 17. The apertures 17 are parallel to one another, extend transversely of the band 12, and are parallel to the axis of ring 11. The apertures are spaced from the inside face 20 of band 12 at a distance equal to the radial spacing of the face of channel 16 from the outside or pheripheral faces of flanges 15. The pins 13, disposed through the apertures 17, are thus tangential to both the opposed flanges 15 and are thereby maintained in alignment with one another.

A bolt 21 is attached to the ring 11 and extends radially outwardly therefrom. A clamp 14, in the form of a curved plate 22 carrying spaced angled fingers 23, is urged against the band 12 by means of thumb screw 24. The band 12 is pliable and readily deformed, and securely held in position by fingers 23 which locally compress but do not pierce the band 12.

The band 12 is flexible but longitudinally inelastic and exerts moderate frictional force to maintain the pins 13 normally in fixed position, and to provide for adjustment of position by application of moderate force. A strip or band of solid rubber or other flexible material having sufficient thickness to render it substantially inelastic, with drilled apertures for the pins 13, is shown in Figs. 1, 2, and 3. Referring more particularly to Fig. 4 of the drawings, the band 12 preferably includes a layer or strip of flexible material having capacity to stretch in only one direction: laterally or transversely of the belt 12, for example. This is desirably in the form of the rubberized one-way stretch fabric 25 consisting, for example, of a set of parallel aligned textile cords all imbedded in a rubber sheet which serves as a binder for the cords. Affixed to the rubberized fabric strip 25 is the strip of rubber 26, and the rubberized fabric strip 27 is affixed to the rubber 26. Rubber strip 26 consists of elastic material and has capacity to stretch radially of the ring 11 when a pin 13 is inserted into the corresponding hole or transverse passage, which is somewhat undersize with respect to pin 13. Rubberized fabric strip 27 is similar to strip 25 but has capacity to stretch in only one direction, different from the direction of stretch of rubberized strip 25. For example when the strip 25 has capacity to stretch only laterally of the band, the strip 27 may have capacity to stretch only longitudinally thereof. Thus the belt 12 is flexible but substantially inelastic.

The apertures accommodating the pins 13 are formed at the juncture between the strips 25 and 26. Thus the pins 13 are maintained in position by a rather substantial friction engagement with the rubber 26 and by the relatively slight friction resulting from contact with the rubberized strip 25 which has a smooth surface with minimum tendency to grip the pins 13. The pins 13 may be adjusted transversely of the band 12 by exerting moderate force endwise of pins 13, or by applying such endwise force in combination with a force urging the pin bodily against the rubberized fabric 25, thus minimizing the friction due to the rubber strip 26 during the course of such transverse adjustment.

Referring now specifically to Fig. 5 of the drawings, the modified form of band 12 there represented includes the flexible strip 30 which is desirably a heavy strip of rubber, the one-way stretch rubberized fabric strips 31, 32 which have capacity to stretch only in different directions and are accordingly substantially inelastic when affixed to one another, the central strip of rubber 33, the one-way stretch strips 34, 35 which are counterparts of strips 31, 32, and the heavy rubber strip 36. All the strips 30—36 are affixed together. From Fig. 5 it will be observed that the pins 13 are projected through suitable apertures, and are normally in contact with rubber 33 and rubberized cloth 32.

Figure 7:
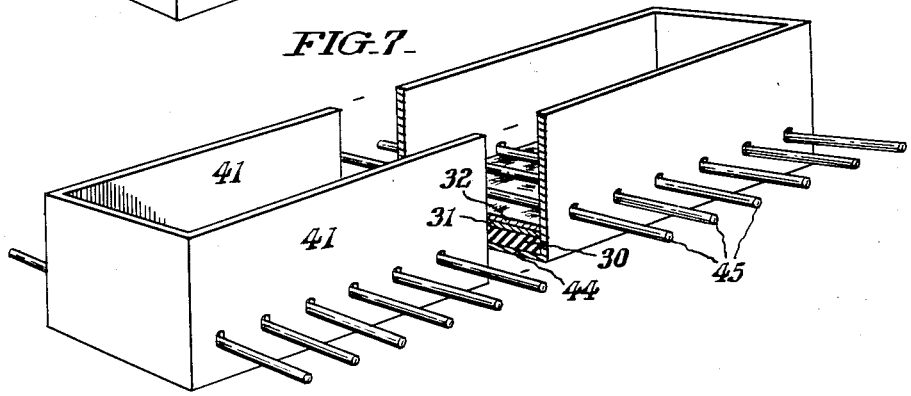
Fig. 7 represents a view similar to Fig. 6, illustrating the positions of the parts of the mold during the course of formation of a flexible band.
Figure 8:
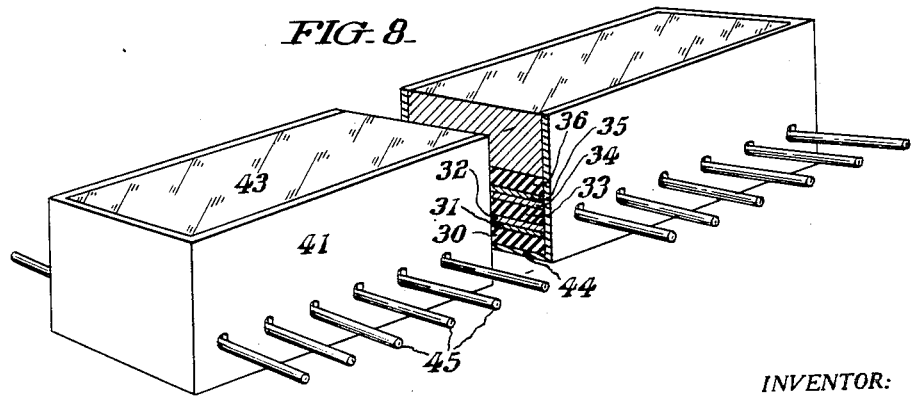
Fig. 8 represents a view similar to Figs. 6 and 7, illustrating the positions of the parts for carrying out a subsequent step of the method.

The method and apparatus for producing flexible inelastic bands such as the bands represented in Figs. 4 and 5 will become more fully apparent upon referring to Figs. 6–8 of the drawings. The number 40 represents a rectangular mold having a pair of opposed side walls 41 carrying opposed sets of aligned vertically disposed slots or elongate apertures 42. The heavy lid 43 is shaped to fit into the open top of mold 40.

A flexible inelastic band, as for example the band of Fig. 5 is made by placing the heavy rubber strip 30 on the bottom or floor 44 of mold 40, and inserting one-way stretch strips 31 and 32 in succession. The mold pins 45 (similar in cross section to the pins 13 of the adjustable template 10) are projected through the aligned apertures 42, contacting the top surface of the one-way stretch strip 32. Mold pins 45 are free to slide up and down in slots 42. The strips 33, 34, 35, 36 are placed in succession on top of one another in the mold 40 and lid 43 is fitted in place, as shown in Fig. 8. Rubber cement or other means for affixing the strips together may be spread between selected adjacent strips. However all the strips of the band preferably embody uncured rubber. Lid 43 is sufficiently heavy to exert substantial downwardly directed pressure against the material in the mold, and additional pressure may also be supplied by clamps or other conventional means. The downwardly directed pressure urges the mold pins 45 toward the lower ends of slots 42. The mold is then placed in an oven or is otherwise heated, at a temperature of 285° F. for a period of 35 minutes, for example, while maintaining the contents under pressure, to cure the rubber. The strips adjacent the uncured rubber strip are thereby affixed to it and all other adjacent strips embodying uncured rubber are accordingly affixed to one another. Thus there is formed a single band having the advantages of flexibility without sufficient elasticity to permit non-uniform elongation of the band 12 under service conditions. After the band is permitted to cool the pins 45 are withdrawn and the band is removed from the mold.

The operation of the adjustable template or intersection marker will be readily apparent. The parts of the apparatus are assembled as indicated in Fig. 3 of the drawings, the outside diameter of channel 16 of the ring 11 being equivalent to the outside diameter of one of the intersecting pipes or tubes. The adjustable template is applied to the pipe or tube B, the pins 13 being disposed at an angle with respect to the axis of the pipe B equal to the angle eventually to be occupied by the other pipe to be incorporated into the joint. The operator grasps any stationary portion of the adjustable template, such as the ring 11 or band 12 for example, and urges this portion of the template in the direction of the axis of pipe B. Under the influence of the moderate force exerted by the operator, certain of the pins 13 are displaced transversely of the band 12 as the ring 11 approaches the pipe B. Eventually each of the pins 13 will contact the surface of the pipe B, and a line A is drawn on the surface of the pipe B, connecting together the points contacted by the ends of pins 13. The clamp 14 is then removed from the adjustable template and the band 12 disposed circumferentially around the second pipe (not shown) which is to be joined to pipe B. The ends of the pins 13, which remain in position after adjustment, will then define the proper end contour of such second pipe for forming the joint with pipe B. Both pipes of the joint may then be burned or cut in a conventional manner, following the markings placed thereon, and welded together or otherwise joined.

It will be appreciated that the device is readily adapted for use in connection with pipes or tubes of varying sizes. For convenience a complete set of rings 11 and bands 12 may be provided in sizes corresponding to the measurements of standard pipes or tubes. The number and spacing of the transverse apertures in the bands 12 may be varied in accordance with the specific applications for which they are intended; however these bands for use in connection with proportionally smaller pipes will ordinarily be provided with a correspondingly lesser number of apertures. While I have illustrated in the drawings specific methods and apparatus constituting preferred embodiments of the invention, it will be appreciated that various modifications may be made in the sequence of steps of the method and in the form of the apparatus, and that equivalent methods, elements and mechanisms may be substituted therefor without departing from the scope of the invention. All such changes, including reversals of parts and the use of certain features of the invention independently of other features, all fall within the spirit and scope of the invention as defined in the appended claims.

Having thus described my invention, I claim:

1. An adjustable template comprising a rigid ring, a flexible inelastic band consisting of a plurality of continuous layers of sheet rubber bonded to an intermediate layer of inelastic material, said band being disposed peripherally on said ring, means for maintaining said band on said ring, said band having a series of transverse apertures adjacent one of the rubber sheets, and pins frictionally maintained in said apertures against the rubber.

2. An adjustable template comprising a ring, a peripheral channel on said ring, a flexible band disposed in said channel, said band consisting of a continuous strip of longitudinally inelastic rubber having a series of apertures extending therethrough parallel to the axis of said channel, pins frictionally maintained in said apertures against the rubber, and releasable attaching means for securing said band in said channel.

3. An adjustable template comprising a ring, a peripheral channel on said ring, peripheral flanges having aligned external edges bounding said channel, a flexible band consisting of an elongated strip of rubber that is substantially inelastic longitudinally, said rubber strip having a series of apertures extending therethrough parallel to the axis of said peripheral channel, said apertures being substantially equidistant from one face of the band, pins frictionally maintained in said apertures, and means for securing said band in said channel, the depth of said channel being substantially equal to the spacing of the pins from said face of the band, whereby the pins are maintained substantially in alignment by contact with the faces of the channel flanges.

4. An adjustable template comprising a rigid supporting member having a peripheral channel therein, a flexible band including strips of soft rubber and rubberized cloth attached to one another, said band having spaced holes intermediate said rubber and cloth, said holes extending transversely of said layers and from edge to edge thereof, pins in said holes, said pins being normally maintained in a position by friction contact with said soft rubber but readily movable under application of moderate force directed to effect sliding contact with said rubberized cloth, and means for maintaining said flexible band in said channel with the pins disposed transversely of said channel.

5. An adjustable template comprising a ring, a peripheral channel in the outward curved surface of said ring, a flexible longitudinally inelastic band of length less than the circumference of said channel and disposed therein such that the ends of said band are spaced somewhat apart, said band being radially elastic and having a series of apertures extending therethrough parallel to the axis of said ring, pins frictionally maintained in said apertures, and a clamp attached to said ring for securing said band in said channel, said clamp including a radially movable plate engageable with both ends of said band and disposed outwardly thereof, and said plate carrying inwardly projecting fingers adapted to deform said band.

6. An adjustable template comprising a band including attached layers of flexible elastic and flexible inelastic material, said band having spaced holes intermediate one of said elastic layers, said holes extending transversely of said layers and from edge to edge thereof, a ring around which said band is peripherally disposed, means for maintaining said band on said ring, and elongate pieces of rigid material longer than and adjustably disposable in said holes, said pieces having cross-sectional areas somewhat greater than the cross-sectional areas of said holes such that when said pieces are inserted in said holes the surrounding elastic layer is elastically deformed, whereby said pieces are frictionally maintained in the desired position in said holes.

7. The invention set forth in claim 6 characterized in that said ring is provided with a coaxial peripheral channel defined by flanges, that said band is disposed in said channel, and said holes being so disposed radially of said band that said elongate pieces abut said flanges when positioned in said holes.

VERNON L. BARNES.

References Cited in the file of this patent

UNITED STATES PATENTS

| Number | Name | Date |
| --- | --- | --- |
| 241,241 | Ruge | May 10, 1881 |
| 397,132 | Kimball | Feb. 5, 1889 |
| 776,713 | Wurts | Dec. 6, 1904 |
| 951,873 | Wirt | Mar. 15, 1910 |
| 1,209,986 | Mason | Dec. 26, 1916 |
| 1,647,707 | Mears | Nov. 1, 1927 |
| 2,140,692 | Daly | Dec. 20, 1938 |
| 2,380,919 | Bugenhagen | Aug. 7, 1945 |
| 2,454,719 | Scogland | Nov. 23, 1948 |